(12) United States Patent
Westhoff et al.

(10) Patent No.: US 7,815,961 B2
(45) Date of Patent: Oct. 19, 2010

(54) PROCESS FOR CONCENTRATING FRUIT AND VEGETABLE JUICES, AND CONCENTRATES THEREBY OBTAINED

(75) Inventors: Gerrit Marten Westhoff, Amersfoort (NL); Tjeerd Jongsma, Bennekom (NL); Piet Haasen, Ottersum (NL); Mathijs Hendrikus J. Martens, Tolkamer (NL)

(73) Assignee: Friesland Brands B.V., Meppel (NL)

( * ) Notice: Subject to any disclaimer, the term of this patent is extended or adjusted under 35 U.S.C. 154(b) by 1220 days.

(21) Appl. No.: 10/504,808

(22) PCT Filed: Jun. 11, 2004

(86) PCT No.: PCT/NL2004/000414

§ 371 (c)(1),
(2), (4) Date: Jan. 27, 2005

(87) PCT Pub. No.: WO2004/110177

PCT Pub. Date: Dec. 23, 2004

(65) Prior Publication Data

US 2005/0276899 A1 Dec. 15, 2005

(30) Foreign Application Priority Data

Jun. 13, 2003 (NL) .................................. 1023665

(51) Int. Cl.
*A23L 1/212* (2006.01)

(52) U.S. Cl. ...................... 426/615; 426/478; 426/521; 426/616

(58) Field of Classification Search ................. 426/616, 426/478, 521, 615; 210/651
See application file for complete search history.

(56) References Cited

U.S. PATENT DOCUMENTS

| | | | | |
|---|---|---|---|---|
| 4,163,725 A | * | 8/1979 | Sano et al. | 210/490 |
| 4,491,600 A | * | 1/1985 | Gobel et al. | 426/384 |
| 4,643,902 A | * | 2/1987 | Lawhon et al. | 426/271 |
| 5,756,141 A | * | 5/1998 | Chen et al. | 426/599 |
| 6,024,998 A | * | 2/2000 | Kreuter et al. | 426/330 |

OTHER PUBLICATIONS

Derwent 1993-190689, week: 200102, "Cloudy fruit wine", May 14, 1993, abstract.*
Johnson, et al. "Flavor Losses in Orange Juice during Ultrfiltration and Subsequent Evaporation", 1996, Journal of Food Science, vol. 61, No. 3, pp. 540-543.*

* cited by examiner

*Primary Examiner*—Helen F Pratt
(74) *Attorney, Agent, or Firm*—Norris, McLaughlin & Marcus

(57) ABSTRACT

The invention relates to a process for concentrating vegetable juice or fruit juice, wherein a permeate stream and a retentate stream are formed by subjecting the juice to an ultrafiltration step and subjecting the permeate stream to evaporative concentration. Further, the invention relates to the use of the thus obtainable concentrated juice for preparing a vegetable or fruit juice by diluting the concentrate with water.

6 Claims, 3 Drawing Sheets

PROCESS FOR CONCENTRATING FRUIT AND VEGETABLE JUICES, AND CONCENTRATES THEREBY OBTAINED

The invention relates to a process for concentrating fruit juices and vegetable juices, which juices will hereinbelow be denoted by the term "juice", as well as to concentrates thus obtained. In a preferred embodiment, the invention relates to the concentration of citrus fruits, for instance, and preferably so, to the concentration of orange juice.

The term "juice" is understood to mean in general an aqueous solution derived from fruit, vegetables and any other crop.

Fresh fruit and fresh vegetables are generally available only during specific seasons, and do not allow of prolonged storage without loss of quality, while moreover occupying much space then. It is partly for these reasons that vegetable products intended for juice production, for the purpose of industrial scale processing, are subjected to pressing shortly after harvesting, after which the produced juice is stored for later processing.

It is then obviously desired that the juices preserve the properties of fresh juice as much as possible, in taste, aroma, and appearance, as well as in mouthfeel.

For storage, however, minimal volume and maximum keepability are aimed for. Therefore, typically, a concentration step is carried out and measures are taken to limit the influence of microorganisms and/or degrading enzymes.

A concentration method industrially applied on a large scale comprises the following steps: the juice is extracted from the vegetable material, after which it is subjected to a (coarse) filtration step; optionally, a centrifugation step is carried out to remove pulp particles; the juice product is pasteurized to inactivate enzymes and to kill off microorganisms; the juice is subsequently evaporated, conventionally in a number of evaporation steps, after which a concentrate remains which is cooled below 25° C. and preferably below 10° C.

The pasteurization step typically takes a length of time of from 4 to 30 seconds at a temperature in the range of 77 to 121° C. In the evaporators, the juice has a residence time of some 6-8 minutes. Especially in these two steps, aroma and flavor components react to off-flavors. Also, aroma and flavor components are broken down and/or volatilized and/or discharged along with the water to be removed.

In a number of cases, aroma and flavors discharged with the evaporation water can be recovered from the first step of the evaporation process and later be added to the concentrate.

Further, it has been proposed to effect concentration without subjecting the juice to a heating step. To be specifically pointed out here are freeze concentration, sublimation concentration and combinations of ultrafiltration and reverse osmosis.

In freeze concentration, water present in the extracted juice is slowly and controllably frozen to ice crystals, which ice crystals are subsequently removed. Optionally, the extracted juice can be centrifuged, whereby a serum stream and a pulp stream are generated. The serum stream is subsequently subjected to freeze concentration and the concentrate obtained can then be combined with the pulp again.

A sublimation concentration process also utilizes the splitting of the juice stream into a serum stream and a pulp stream, after which the serum is subjected to freeze-drying.

In U.S. Pat. No. 4,643,902, a method is described in which juice is subjected to an ultrafiltration (UF) step, in which flavor or aroma components pass the UF membrane and the permeate is subsequently subjected to a reverse osmosis. The membranes used preferably have a molecular weight cut-off of at least 50 kDa, because then microorganisms and pectinesterases are retained in the retentate. The retentate is subjected to a treatment to inactivate these microorganisms and enzymes, typically by heating. Finally, the treated retentate-permeate streams are combined again.

Also in Chemical Engineering 96(8) (1989) p. 17, it is described that FreshNote, "a juice-concentration system combining ultrafiltration and reverse osmosis", from Separa-Systems LP, after ultrafiltration gives a permeate that contains approximately all aroma and flavor components. The retentate is pasteurized.

It is an object of the present invention to provide a process enabling a juice concentration in which as few semivolatile flavor and aroma components as possible are lost, and in which substantially no off flavor producing reactions such as Maillard reactions occur upon evaporative concentration.

This object is achieved by providing a process for concentrating vegetable or fruit juice, in which a permeate stream and a retentate stream are formed by subjecting the juice to an ultrafiltration step across a hydrophilic membrane having a molecular weight cut-off of maximally 80 kDa to a concentration factor of at least 5, after which the permeate stream is subjected to evaporative concentration.

In the process according to the invention —unlike in the U.S. Pat. No. 4,643,902—use is made of hydrophilic ultrafiltration membranes. Although there is a great preference for polysulfone and/or polyether sulfone membranes, other suitable hydrophilic membranes are membranes based on cellulose esters, polycarbonate, polyimide and polyether imide, (aliphatic) polyamides, and polyether ether ketone.

Incidentally, Johnson et at. in J. Food Sc. 61(3) (1996), 540 describe a process for improving the recovery of water soluble aroma components during evaporation. This involves the use of a 500 kDa polysulfone membrane in an ultrafiltration step to reduce the viscosity of the juice through pulp and pectin removal. The aroma components from the clear water phase, the permeate, are recovered after evaporation of that water. Also proteins and enzymes end up in the permeate, which lead to browning and off flavors.

A comparison between the results upon use of a hydrophilic polysulfone membrane as according to the invention and upon use of a hydrophobic polyvinylidene fluoride membrane shows that a considerable part of the aroma components pass the hydrophobic membrane.

Although there are a number of parameters that are of influence on the separating power of a UF membrane, such as the shape and the flexibility of the macromolecules in the solution, their interaction with the membrane and the presence of other particles in the solution, it appears that the separating power of the UF membranes that are used according to the invention can be well accounted for with the MWCO (molecular weight cut-off). On this aspect, reference is made to Marcel Mulder, Basic Principle of Membrane Technology, 2nd edition (1996) Kluwer Academic Publishers.

In the process according to the invention, an MWCO of maximally 80 kDa, preferably maximally 60 kDa, more preferably maximally 50 kDa, and most preferably maximally 30 kDa, is preferred, although some effect occurs already at a MWCO of 100 kDa. The lower limit is not critical, and is in fact determined by the velocity of the ultrafiltration step. In order to obtain a profitable process, a suitable membrane will have an MWCO of 5 kDa, and preferably 10 kDa.

In a practical embodiment, the juice that is concentrated according to the invention will be extracted from the vegetable starting material, typically by pressing. The thus obtained juice is moreover typically subjected to a finishing step, in which pips and the like are removed. Furthermore, optionally a centrifugal step can be carried out in order to remove a part of the pulp.

Preferably, unless indicated otherwise, all treatment steps towards obtaining the concentrated juice are carried out at temperatures below room temperature, and preferably cooled to maximally 15° C.

The juice is subsequently subjected to a pasteurization step, in which the enzymatic activity is inactivated and microorganisms are killed off. This pasteurization step, as the skilled person knows, depends on the juice: typically, it comprises maintaining the juice at 77 to 121° C. for a period of 4-30 seconds. The preferred pasteurization of citrus juice and specifically orange juice is done at 95° C. for 4 seconds. This pasteurization step can be carried out before or after the optional centrifugation step.

Next, the thus obtained juice is ultrafiltered, whereby the retentate (or concentrate) is concentrated at least a factor of 5, but preferably at least a factor of 7.

The retentate of the ultrafiltration step contains the aroma and flavor substances (typically semivolatile substances; α-pinene and limonene can here be mentioned as important examples), at least substantially, the proteins and other macromolecules present. Without wishing to be bound to any theory, it is supposed that these substances have been included in or on an oil phase, which oil phase is possibly associated with macromolecules in the retentate. In a preferred embodiment, the retentate is frozen until use and stored in this condition, for instance at −8 or −18° C. Another preferred embodiment comprises a freeze concentration to for instance 40° Brix; this concentrate is stored cool to some −18° C.

The permeate (approximately 10° Brix) comprises amino acids, sugars and a variety of water soluble components. After being obtained, it is subjected to an evaporation step (evaporative concentration), to a concentration of at least 40° Brix, preferably at least 50° Brix and most preferably above 60° Brix, for instance 70° Brix. The permeate is found to undergo few to no reactions that lead to off flavors, for instance Maillard reactions. The UF permeate is suitably subjected to evaporative concentration in a multi-effect or multi-stage vacuum evaporator. The juice permeate is then present in the evaporator for typically 6-8 minutes. After evaporation, this permeate concentrate is first adjusted to a temperature of some 25° C. by flash cooling, and then stored until use, preferably in frozen condition, for instance at −8° C., but preferably at −18° C.

Finally, the invention concerns the use of the permeate concentrate and the retentate obtainable from the process according to the invention for preparing vegetable or fruit juice by adding a suitable amount of water to the concentrates. Optionally, in that case, additional aroma additives and/or conventional processing aids for this type of product can be added.

In flow chart 1, the process according to the invention is represented schematically. According to this chart, juice-containing vegetable material, for instance oranges, is subjected to a pressing step and finishing step. This yields a finished juice stream 2. This juice stream is pasteurized and subsequently subjected to centrifugation. Incidentally, these latter two steps can be carried out in reverse order, but it is preferred to pasteurize first. In the pasteurization step, enzymes are inactivated and microorganisms killed off.

Stream 5/6 is supplied to an ultrafiltration unit. This yields a retentate stream 7 and a permeate stream 10. The retentate can optionally be subjected to a freeze concentration, for orange juice for instance to 30° Brix.

Stream 10 is subjected to evaporative concentration, with optional stripping of the evaporated water phase of entrained aroma or flavor substances. For oranges, the evaporative concentration yields, for instance, a concentrate of some 66° Brix.

Presently, the invention will be further elaborated in and by the following non-limiting examples. Where percentages are mentioned in the Examples and in the description, these are always percentages by weight based on the total liquid, unless specified otherwise.

EXAMPLE 1

Bench Scale Ultrafiltration

Freshly pressed, prefiltered (filter pore size: 360*360 μm) orange juice was subjected to an ultrafiltration on a bench scale ultrafiltration unit. This UF unit of PVC comprised a 20 kDalton polysulfone membrane (4 tubes, tube diameter 11 mm; membrane type: Berghof P4C 07 AD 3320).

The ultrafiltrate was charge-wise concentrated to a concentration factor 7 at a process temperature of 7° C.

Figure 1:
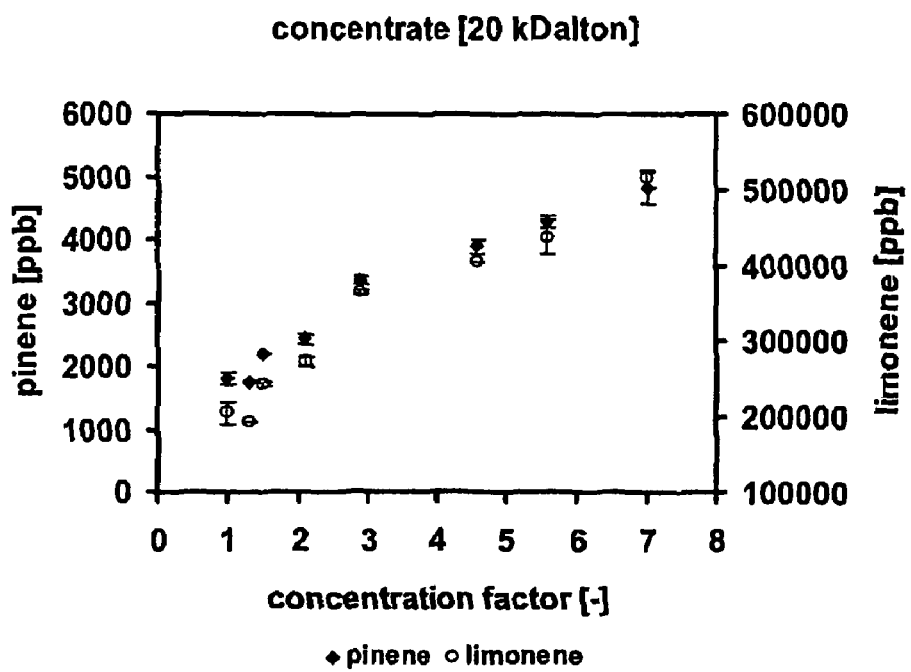
FIG. 1 shows the pinene and limonene concentrations in ultrafiltration concentrate as a function of the concentration factor.
Figure 2:
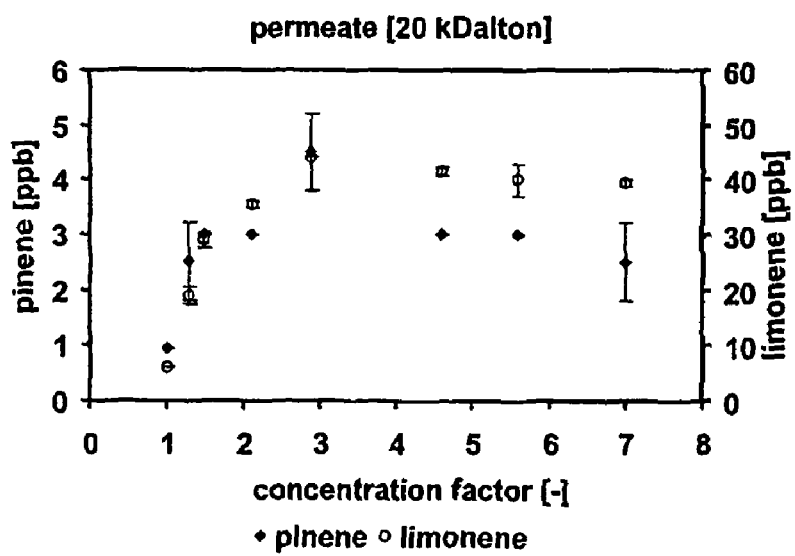
FIG. 2 shows the pinene and limonene concentrations in ultrafiltrations permeate as a function of the concentration factor.

During the process, samples were drawn from UF permeate and concentrate and analyzed for α-pinens and limonene, which are important semivolatile aroma components, with GC, for instance with the method described by Johnson et al. in the above-discussed article in J. Food Sc. (1996). FIG. 1 shows the pinene and limonene concentrations in UF concentrate as a function of the concentration factor; FIG. 2 shows these concentrations in the UF permeate.

It follows from FIG. 1 that both components remain behind in the UF concentrate, at least are concentrated; FIG. 2 shows that after a concentration factor 2 the concentration of the two components in the permeate remains substantially constant.

EXAMPLE 2

Ultrafiltration Of Orange Juice On Pilot Plant Scale

Freshly pressed (sweet/acid ratio 10.6 11; Brix 10.2°), prefiltered (filter pore size: 360*360 μm) orange juice was pasteurized (4 seconds at 95° C.). The pulp content was 7.3% after the filtering step. This juice was stored cool at 4° C.

A double-walled stainless steel 500-liter vat was filled with pasteurized orange juice. The juice was circulated with a centrifugal pump. A second centrifugal pump circulated the juice over the membranes (20 kDa polysulfone membranes; pH-range 2-12; maximum pressure 8 bar); the inlet and outlet pressures were 5.3 and 4.0 bar, respectively, the average transmembrane pressure was 4.7 bar, the cross flow velocity was 4 m/s, the operating temperature was approximately 10° C. The permeate was collected in stainless steel vats. The 500-liter vat was filled until the desired volume of juice had been concentrated.

Figure 3:
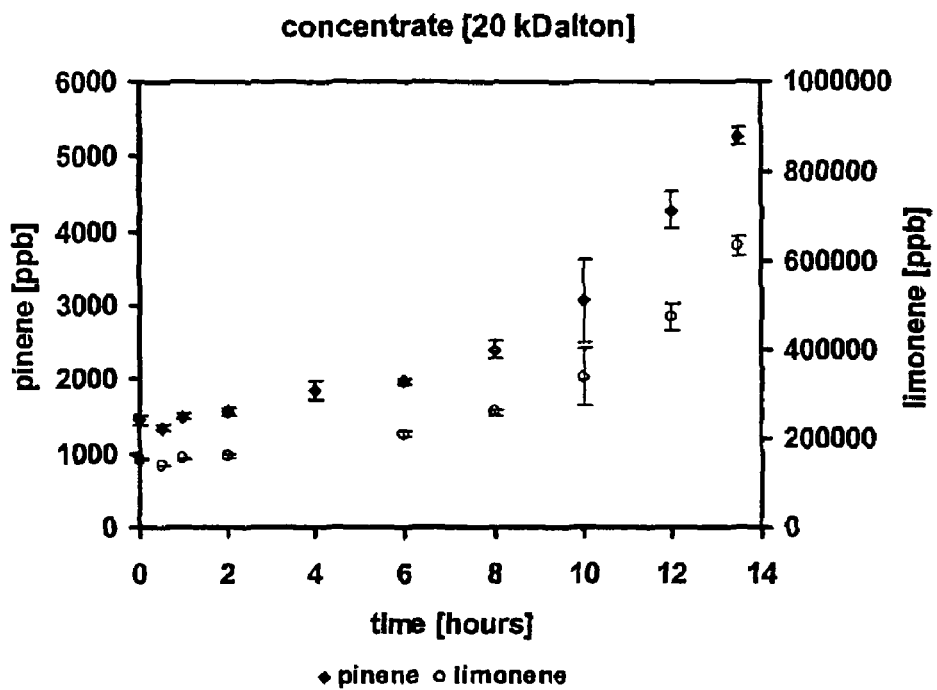
FIG. 3 shows the pinene and limonene concentrations in ultrafiltration concentrate as a function of time.
Figure 4:
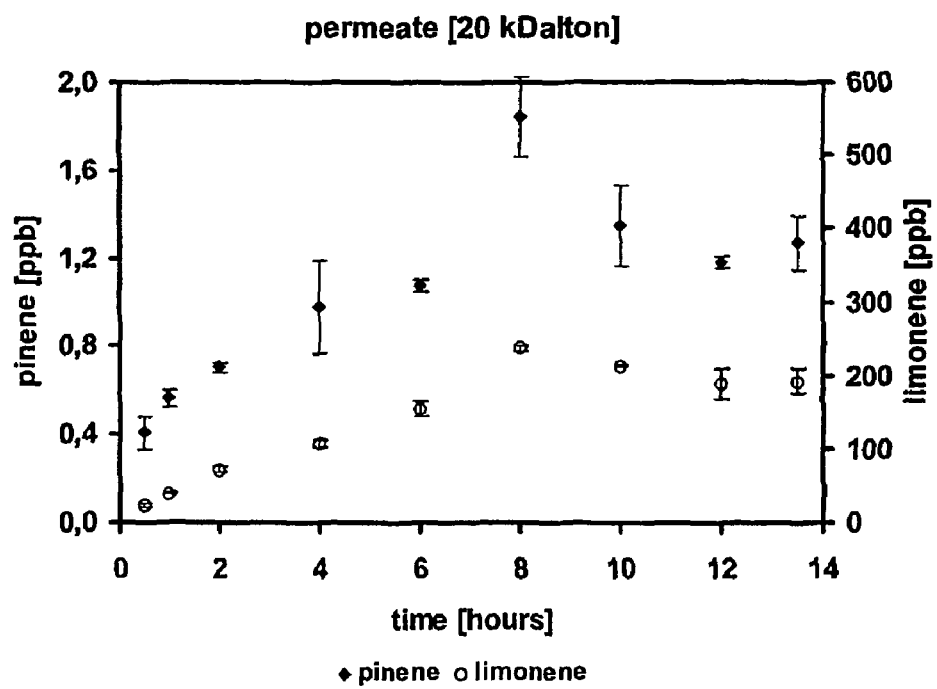
FIG. 4 shows the pinene and limonene concentrations in ultrafiltration permeate as a function of time.

Prior to and during the UF, samples were drawn and the α-pinene and limonene concentrations were determined. Table 1 lists the concentrations for the sting materials. FIGS. 3 and 4 show the pinene and limonene concentrations in UF concentrate and UF permeate, respectively, measured in time. From FIG. 3, it follows that the α-pinene and limonene concentrations remained fairly constant for 8 hours. After those 8 hours, no new orange juice was supplied anymore, after which the concentrations of pinene and limonene increased. FIG. 4 shows that the pinene concentration stabilizes at a value of 1.2 ppb; the limonene concentration comes to about 400 ppb.

TABLE 1 pinene and limonene concentrations in orange juice

| Orange juice (ratio: 10.6-11 Brix: 10.2) | Pinene [ppb] | Pinene (duplicate) [ppb] | Limonene [ppb] | Limonene (duplicate) [ppb] |
|---|---|---|---|---|
| freshly pressed juice | 1100 | — | 120688 | — |
| filtered juice | 1191 | 1268 | 125387 | 132466 |
| pasteurized juice | 1004 | 989 | 105820 | 107837 |

EXAMPLE 3

Effect of the Operating Temperature on the α-Pinene and Limonene Concentrations in the UF Permeate In the pilot-plant arrangement described in Example 2, freshly pressed, pasteurized orange juice was concentrated at an operating temperature of 7° C. to a concentration factor of 8. After this, the operating temperature was raised to 15° C. and 27° C.

Figure 5:
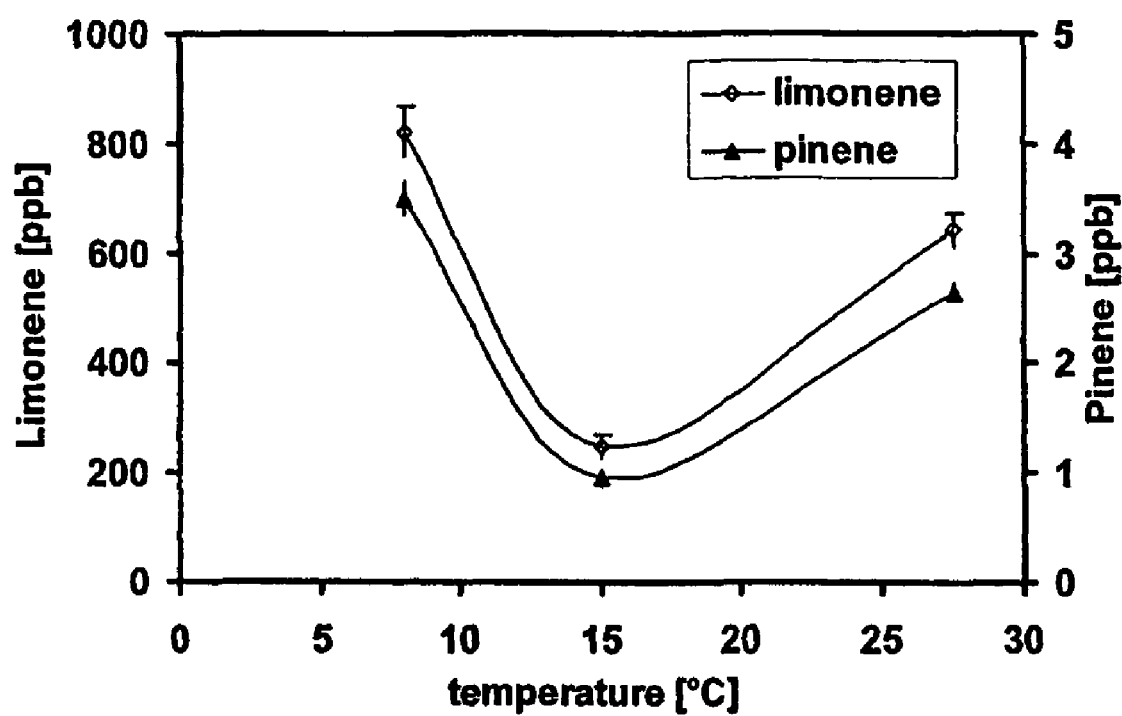
FIG. 5 shows the pinene and limonene concentrations in the ultratfiltration permeate as a function of temperature

The concentrations of α-pinene and limonene in the UF permeate are represented in FIG. 5 as a function of the temperature. At the relatively high temperature of 27° C., the concentrations of limonene and pinene prove not to increase to a great extent; in the range of 7-27° C., therefore, the operating temperature has no, at least no substantial, influence on the selectivity of the membrane.

EXAMPLE 4

Development of Off-Flavors from Limonene

Orange juice was concentrated on a so-called 4-effect 7-stage TASTE citrus evaporator in conformity with the method described by Nagy et al. in: Fruit Juice Processing Technology, AGScience, Inc., Auburndale, Fla. 1993 (prewarming from 7-76.7° C. in 80 sec.; effect 1, preheating 10 seconds from 76.7-96.1° C.; effect 2, $2^{nd}$ stage, 96.1-81.1° C.; effect 3, $3^{rd}$ stage, 81.1-70.6° C.; effect 3, $4^{th\ stage}$, 70.6-53.9° C.; effect 4, $5^{th}$ stage, 53.9-41.1° C.; effect 4, 6th stage, 45.0-39.4° C.; effect 4, $7^{th}$ stage, 45.0-39.4° C.). The compound α-terpineol formed from limonene, a strong "off flavor", was determined for freshly pressed orange juice, and for the permeate of freshly pressed orange juice subjected to ultrafiltration using the bench scale unit of Example 2. For fresh orange juice, a concentration of α-terpineol was found of 0.012 mg/liter; for the permeate according to the invention, a concentration of 0.0012 mg/liter was found. A factor 10 of α-terpineol is formed when the ultrafiltration step is carried out.

The invention claimed is:

1. A process for concentrating vegetable juice or fruit juice comprising the following steps:
   (i) pasteurizing the juice;
   (ii) subjecting the pasteurized juice to an ultrafiltration step across a hydrophilic membrane having a molecular weight cut-off of maximally 60 kDa to a concentration factor of at least 5 to form a permeate stream and a retentate stream, wherein the retentate stream contains aroma and flavor substances;
   (iii) subjecting the permeate stream to evaporative concentration; and
   (iv) recombining the concentrated permeate stream with the retentate stream.

2. A process according to claim 1, wherein as hydrophilic membrane a polysulfone and/or a polyether sulfone membrane is used.

3. A process according to claim 1, wherein a citrus fruit juice is concentrated.

4. A process according to claim 3 wherein the citrus fruit juice is an orange juice.

5. A process according to claim 1, wherein the permeate stream is subjected to evaporative concentration to a concentration of at least 40° Brix.

6. A process according to claim 5 wherein the permeate stream is concentrated to at least 50° Brix.

* * * * *